3,669,644
RECLAMATION OF COPPER FROM
COPPER-CLAD STEEL
Jack Sato, Dyer, Ind., assignor to SCM Corporation,
Cleveland, Ohio
Filed Feb. 3, 1971, Ser. No. 112,208
Int. Cl. C22b 7/00
U.S. Cl. 75—.5 B    13 Claims

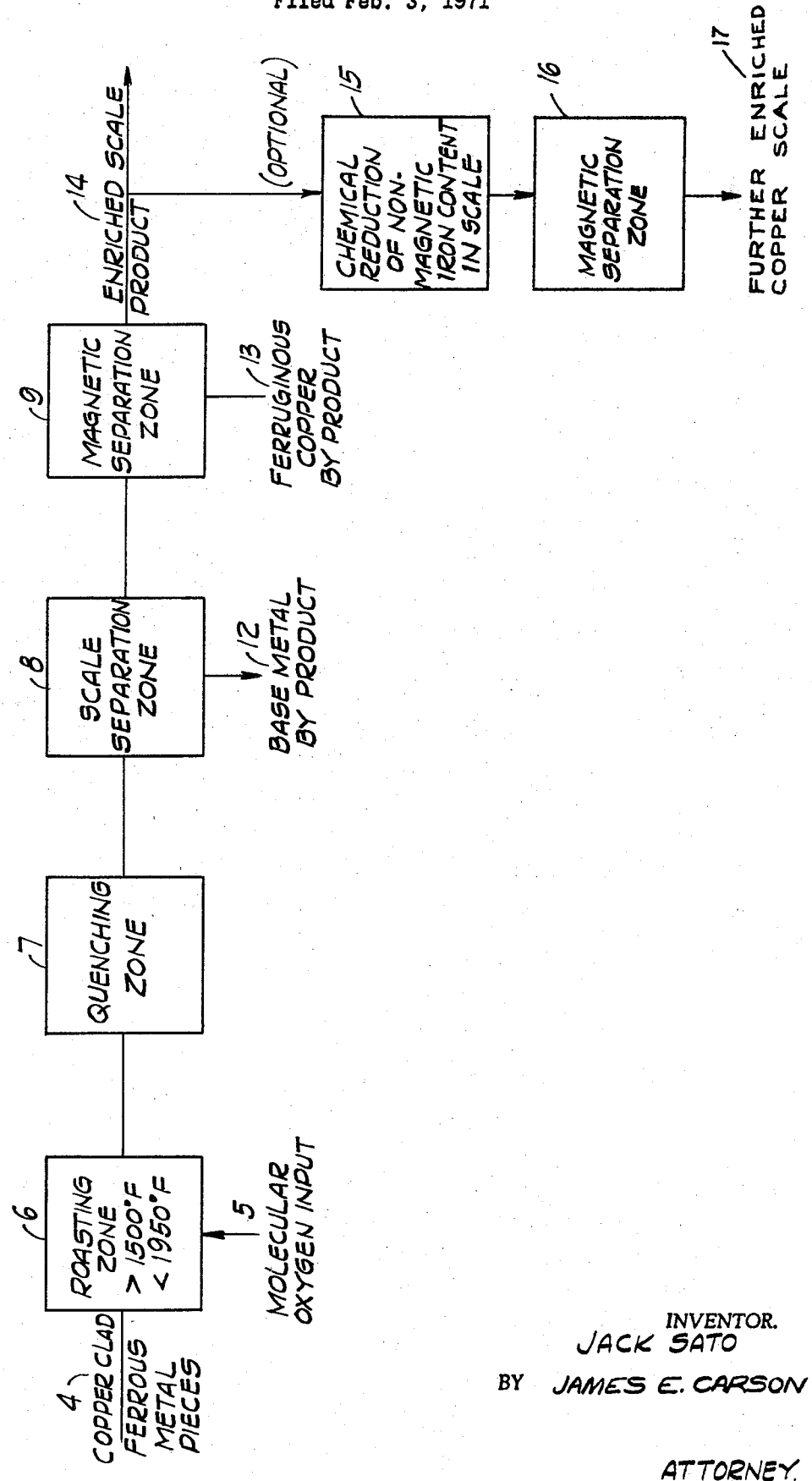

ABSTRACT OF THE DISCLOSURE

Cuprous powder of desirable quality is produced by roasting pieces of copper-clad ferrous metal such as steel in air between about 1500° F. and about 1950° F. until copper-rich scale is formed containing minor iron content; separating the scale from base metal; magnetically cleaning the separated scale to remove iron content therefrom.

BACKGROUND OF THE INVENTION

There has been a long-felt need in the metallurgical arts to find a simple, inexpensive method for recovering copper having desirable qualtities such as high purity, minimal iron content, and minimal amounts of insolubles (silica, alumina, etc.) from copper-clad ferrous metal scrap. The term "cladding," hereinafter referred to in the specification, is defined as true cladding plating or otherwise coating the base metal with a copper surface of high copper content. The term "cuprous powder" refers to particulate elemental copper and/or an oxide of copper.

Prior attempts to salvage usable copper from such scrap have been unsuccessful as the amount of recovery of desirable cuprous products has been too low and contamination too high. A Bureau of Mines Report No. 6647 entitled, "Removing Copper From Copper-Clad Steel by Oxidation," R. J. Leary, 1965, describes the oxidation of copper-clad steel at low and high temperature ranges. As reported, the resulting copper scale recovered at high temperature was highly contaminated iron oxides; when such copper-clad steel was oxidized at low temperature, iron contamination in the resulting scale was lessened, but the overall recovery of copper was undesirably low.

It is an object of the present invention to provide an improved and economical method for the production of cuprous powder of desirable metallurgical qualities from scrap copper-clad ferrous metals. It is a further object of the present invention to provide a method for controlling the amount of impurities in cuprous powder recovered from scrap copper-clad ferrous metal. It is a further object of the invention to provide an inexpensive processs to salvage scrap copper-clad ferrous metals into salable metals for metallurgical industries.

BRIEF DESCRIPTION

The figure depicts schematically the various steps of the process in flow sheet form. Pieces of copper-clad ferrous metal 4 are fed to roasting zone 6 in the presence of air at a temperature range generally above about 1500° F. and below about 1950° F. until rich scale is formed. The second stage of the process is the separation of the copper scale in separation zone 8 from base metal 12. Prior to scale separation the scale is quenched (cooled) in quenching zone 7. Following separation of the scale from the base metal is the magnetic cleaning of the scale in magnetic separation zone 9 to remove iron containing particles and to form an enriched copper scale product 14. Optionally, the Cu content in the enriched copper scale product 14, can be further enriched by reducing the non-magnetic iron content in scale to a magnetic condition in chemical reduction zone 15 and subjecting the reduced scale to further magnetic cleaning in magnetic separation zone.

DETAILED DESCRIPTION OF THE INVENTION

In the first step of the process, pieces of copper-clad ferrous metal, such as pieces of copper-clad steel wire, are roasted at a temperature of 1500°–1950° F. until copper-rich scale containing minor iron content is formed. This takes at least about 60–90 minutes at the higher temperatures in this range and can extend to two or more hours at the lower temperature. The higher temperatures are preferred for speed, but selected to preclude melting of the copper. The lower temperatures require a longer roast, but can often give a better copper grade.

Preferably, roasting of the feed is done in the presence of air for economy and efficiency. Optionally, tonnage oxygen, free oxygen-bearing flue gases, or oxygen-enriched air can be used. During roasting, the copper is oxidized mainly to cuprous oxide.

Insolubles are best suppressed by using a cleaned feed. If the surface of the copper-clad ferrous metal is lacquered or insulated, such coating is first removed by conventional methods such as stripping, incineration, dissolving, etc. Suitable equipment for roasting are furnaces such as muffle ovens, hearth furnaces, such as multiple hearth rotary furnace, electric furnace, shaft furnace. To prevent abrasion of refractory from contaminating the product with insolubles, the roasting apparatus preferably is designed so that nibbing of the walls by the roast charge is minimized or eliminated.

After roasting, the copper-rich scale then is separated from the base metal. Separation can be done by any of the following methods: screening or tumbling wherein the adherent scale is removed using conventional screening apparatus such as a Rotex, Sweco, or Hum-mer screen, vibrating or rotating screens, rotating mills, etc. In the roasting, some of the copper disengages itself spontaneously; this, of course, is also collected.

The base metal by-product after separation is substantially iron and its oxides with about 0.5–2.0% as copper and copper oxides. This can be sold to steel manufacturers for making copper-bearing or other steels. Optionally, a second roasting of the by-product base metal can be employed to remove the balance of the copper.

Prior to such separation, the roast can be wet or dry quenched to cool it. Quenching may be done with natural convection in air, forced air cooling, or liquid cooling; e.g., water, which can aid in spalling off scaly cuprous particles. Natural convection in air is preferred for economy, and even the loading of the roast into cool separating apparatus often is an effective quench.

After separation of the copper-rich scale from the base metal, the scale can be subjected to magnetic separation. The terms "magnetic separation," "magnetic enrichment," and "magnetic cleaning' are used interchangeably, and refer to the magnetic removal of iron containing particles from the copper scale. Advantageously, the iron content in the scale is reduced to not substantially above about 0.25% by magnetic separation. Preferably, the iron content in scale can be reduced to less than 0.10% by repeated dry magnetic separation or lower by wet magnetic separation. Magnetic cleaning can be done with permanent or electromagnets by hand with Ding separators, magnetic "combs," and other conventional magnetic separation devices. Preferred size of scale for handling in the magnetic cleaning process is between about 20 and 150 mesh, U.S. Standard Sieve size, although smaller or larger particles; e.g., 5 to 400 mesh can be used and the scale can be comminuted prior to or during such cleaning and classified as to size by conventional methods if desired or necessary. The by-product from the magnetic separation process is copper-rich iron particles, which is salable to copper smelters.

Optionally, the enriched copper scale from the magnetic cleaning can be further enriched by the chemical reduction of the non-magnetic iron content in scale to a magnetic condition, and then subjecting the scale to further magnetic cleaning. It is thought that non-magnetic iron oxides in the scale are converted to magnetic iron oxide and/or iron metal. An oxide content of 6% or less in such iron, indicates that it is generally magnetic. Reduction can be done by conventional means; e.g., subjecting the non-magnetic iron content in scale to hydrogen, dissociated ammonia, carbon monoxide, endothermic, and mixtures of the same for 10–60 minutes at a temperature in the range of 600°–1400° F. On occasion, the scale need not be so reduced, particularly if the copper product can tolerate as much as about 0.10% iron.

The resulting scale is substantially magnetically purified cuprous oxide ($Cu_2O$), which can subsequently be used as such or reduced conventionally to copper powder. Analysis of typical reduced oxide scale from this process has shown an iron content of less than 0.08%, and a copper content of 99.04%. Such copper is particularly useful for copper powder products. Reduction can be done with carbon and/or the gases and procedures previously mentioned.

The copper powder or copper oxide product from this process can be comminuted to suitable screen size for powder metallurgy, paint agricultural, chemical, or other use. Preferable size for powder metallurgy is finer than 100 mesh. Preferable copper oxide size for paint is finer than 325 mesh.

The following examples show ways in which my invention has been practiced, but should not be constructed as limiting the invention. In this application, all temperatures are in degrees Fahrenheit, all pressures in p.s.i., and all percentages and parts are weight percentages and parts, unless otherwise expressly specified.

Example 1

A tray loaded with pieces of copper-clad steel wire clippings (0.1" diameter x 1" to 2" in length) was fed to a muffle oven in the presence of air at a temperature of 1800° F. until a copper-rich scale was formed. Roasting time was one hour. A portion of the scale spontaneously flaked off from the base steel wire. The entire roast was air-cooled during transfer and loading into a rotating chamber. The load was tumbled for 10 minutes to separate the preponderance of the remainder of the copper scale from the steel. The scale was comminuted to about 20 to 30 mesh size, and then subjected to magnetic cleaning with a strong permanent magnet to remove magnetic iron and iron oxide. The Cu scale contained 1.13% iron. The non-magnetic iron content in scale was chemically reduced to a magnetic condition by reducing it with dissociated ammonia gas at 700° F. for one hour. The thus-reduced scale was then subjected to further magnetic cleaning with a strong permanent magnet. The resulting product analyzed 99.04% copper, and 0.08% iron.

Original copper fed was 400 parts containing 21.68% copper. Recovery of the copper powder was about 84.7%. Byproducts were 321.0 parts of partially oxidized base metal containing 3.07% copper, and 6.9 parts of copper-rich magnetically separated scale.

Example 2

The following table shows the results of several oxidation runs under various conditions. Roasting and single magnetic enrichment were done like that in Example 1, except that the conditions were changed as stated in the table.

| | A | B | C | D[1] |
|---|---|---|---|---|
| Oxidizing temperature | 1,800 | 1,800 | 1,500 | 1,800 |
| Oxidizing time, minutes | 60 | 60 | 120 | 60 |
| Method of quench | [2] | [2] | [2] | [2] |
| Special treatment of separated scale before analysis | None | [3] | None | [4] |
| Analysis of scale: | | | | |
| Iron | 1.54 | 0.07 | 0.06 | .07 |
| Insolubles | 1.20 | 0.16 | 0.19 | 0.24 |
| Lead | | | | Nil |
| Total copper | 84.81 | 87.14 | 87.18 | 87.87 |
| TRP [5] | | 94.60 | 84.80 | |
| $Cu_2O$ | | 90.70 | 73.00 | |
| Free copper | | 1.73 | 5.06 | |
| Yield, approximate percent | | 82 | 35 | 84.71 |

[1] In Example 1, the iron content in scale was reduced to 0.07% by magnetic cleaning only without chemical reduction of the nonmagnetic iron content in scale.
[2] Air cool.
[3] Magnetic enrichment.
[4] Repeated magnetic separation.
[5] Total Reducing Power (TRP) is defined as the reducing power of unoxidized copper or cuprous oxide ($Cu_2O$) or a mixture of both in the presence or absence of cupric oxide (CuO) on a ferric chloride solution. Pure copper has a TRP of 225, while cuprous oxide has a TRP of 100, and cupric oxide has a TRP of 0 (zero). The measurement of TRP was developed by the Bureau of Ships of the U.S. Navy Department (MIL-P-15169) to define a method to analyze the amount of cuprous oxide present in a mixture of copper, cuprous oxide, and cupric oxide powders. A method of chemical analysis for TRP is described in ASTM Standard D283-52.

In further runs, roasting temperatures as high as 1940° F. were used for up to 120 minutes to leave only a trace of copper on the base metal. If the base metal contains apprecible copper, it can be re-roasted and processed alone or with fresh copper-clad ferrous metal. If desired, my process can be combined with a low-temperature first roast (1000°–1500° F. for 1 to 5 hours) to obtain and separate a low-iron cuprous powder, with the separated base metal being re-roasted under severer conditions subsequently, and the scale being magnetically separated.

What is claimed is:
1. A process for producing cuprous powder from pieces of copper-ferroous metal which comprises:
   (a) roasting in a roasting zone said pieces in the presence of molecular oxygen at a temperature between 1500° F. and 1950° F. until copper-rich scale containing minor iron content is formed;
   (b) separating said scale from resulting base metals; and
   (c) magnetically cleaning the separated scale for removal of iron therefrom.

2. The process of claim 1 wherein the separated scale is magnetically cleaned to leave an iron content not substantially above about 0.25% therein.

3. The process of claim 1 wherein residual iron oxides in the magnetically cleaned scale are substantially all reduced to a magnetic condition, and the resulting reduced scale is subjected to further magnetic cleaning.

4. The process of claim 1 wherein said roasting is done at a temperature of about 1600° F. to 1850° F. for about one-half (½) hour to three (3) hours.

5. The process of claim 1 wherein the roast is quenched prior to said magnetic cleaning.

6. The process of claim 1 wherein at least one of the steps (b) and (c) is done wet.

7. The process of claim 1 wherein at least one of the steps (b) and (c) is done dry.

8. The process of claim 1 wherein the enriched scale is comminuted to −325 mesh fineness.

9. The process of claim 1 wherein the magnetically enriched scale is reduced to remove substantially all combined oxygen.

10. The process of claim 9 wherein the reduced product is comminuted to at least −100 mesh fineness.

11. The process of claim 1 wherein the particle size of the scale submitted to said magnetic enrichment is between 5 and 400 mesh.

12. The process of claim 1 wherein, during said roasting, contact of the pieces in process is substantially restricted to contact with each other.

13. The process of claim 1 wherein the roasting above 1500° F. and below 1950° F. is preceded by a preroast of said pieces at about 1000° F. to 1500° F. and separation of resulting low-iron scale.

References Cited

UNITED STATES PATENTS

| Re. 25,034 | 8/1961 | Proler | 75—63 |
| 2,683,085 | 7/1954 | Löhberg | 75—63 |
| 3,549,350 | 12/1970 | McGee | 75—.5 BA |

FOREIGN PATENTS

| 573,389 | 11/1945 | Great Britain | 75—63 |

L. DEWAYNE RUTLEDGE, Primary Examiner
W. W. STALLARD, Assistant Examiner

U.S. Cl. X.R.

23—147, 148; 75—.5 BA, 63